Figure 4:
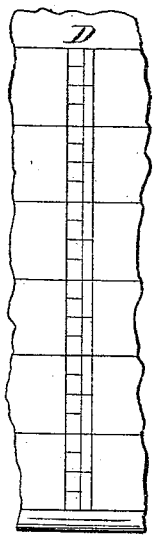
Figure 1:
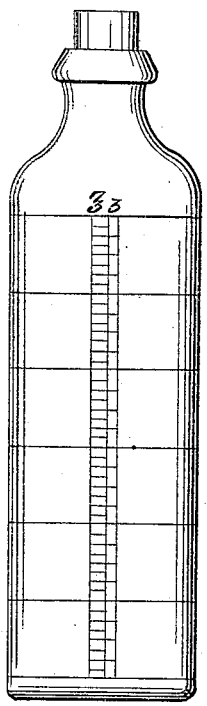
Figure 2:
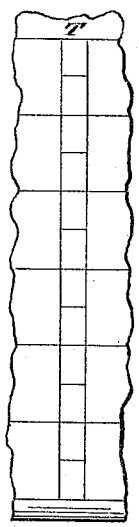
Figure 3:
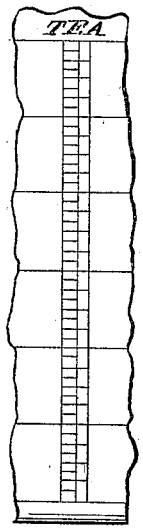

T. P. SHAFFNER.
Graduated Bottle.

No. 60,568. Patented Dec. 18, 1866.

United States Patent Office.

IMPROVED METHOD OF GRADUATING VESSELS.

TALIAFERRO P. SHAFFNER, OF LOUISVILLE, KENTUCKY.

Letters Patent No. 60,568, dated December 18, 1866.

The Schedule referred to in these Letters Patent and making part of the same.

TO ALL WHOM IT MAY CONCERN:

Be it known that I, TALIAFERRO P. SHAFFNER, of Louisville, in the county of Jefferson, and State of Kentucky, have invented a new and useful Graduated Bottle; and I do hereby declare the following to be a full, clear, and exact description of the same, sufficient to enable one skilled in the art to which it appertains to construct and use the same; reference being had to the accompanying drawings, which are made part of this specification, and in which my improved bottle is represented in elevation.

The improvement consists in the manner of marking or graduating the sides of a bottle, for pharmaceutical, household, or ordinary purposes, in which the graduations (which are of a character adapted to the size and contents of the bottle) are so distinguished from each other as to mark the major divisions and the minor or proportionate parts of the former. For instance, in a bottle containing so many ounces, the marks for one, two, three, four ounces, as marked on the bottle, consist of rings blown, pressed, or cut thereon or therein, while the minor divisions, fractional parts of an ounce or tablespoonful, are represented in short lines at the appropriate distances between the rings which mark the major divisions.

A is the bottle, B B the rings, which represent ounces or any other unit of measurement which may be required by the capacity of the bottle and for the purpose to which it is to be dedicated; C are the minor marks, which represent proportionate parts of the larger ones, tablespoonfuls, drams, or whatever convenience may dictate. The height at which the liquid stands indicates against the graduated scale the amount of liquid remaining or contained in the bottle. The graduation may be applied to bottles or vials of any character or size, the marks indicating truthfully the amount of fluid therein contained, by observing the mark opposite to the level of the contained liquid. This graduated bottle will be of great service in the arts and sciences, rendering the use of a separate measure unnecessary in many instances for pharmaceutical, household, and travelling purposes, to measure out a certain quantity of the liquid with sufficient exactness, it is believed, to be a substantial and valuable appliance.

Having described my invention, what I claim therein as new, and desire to secure by Letters Patent, is, irrespective of size, form, or material, the bottle graduated substantially as described and represented.

TAL. P. SHAFFNER.

Witnesses:
EDWARD H. KNIGHT,
ALEX. A. C. KLAUCKE.